United States Patent [19]

Lubcke et al.

[11] Patent Number: 4,995,034
[45] Date of Patent: Feb. 19, 1991

[54] METHOD OF INTEGRATING ONE OR MORE ACCESSORY FUNCTION MODULES IN TELECOMMUNICATIONS SYSTEMS AND ACCESS CIRCUIT FOR USE THEREWITH

[75] Inventors: Hartmut Lubcke; Martin Backhaus, both of Paderborn; Harald Schreiber, Salzkotten, all of Fed. Rep. of Germany

[73] Assignee: Nixdorf Computer AG, Paderborn, Fed. Rep. of Germany

[21] Appl. No.: 449,120

[22] Filed: Dec. 8, 1989

Related U.S. Application Data

[63] Continuation of Ser. No. 1,800, Jan. 9, 1987, abandoned.

[30] Foreign Application Priority Data

Jan. 31, 1986 [DE] Fed. Rep. of Germany ....... 3603013

[51] Int. Cl.⁵ .............................................. H04J 3/16
[52] U.S. Cl. .................................. 370/95.1; 370/85.7
[58] Field of Search .................. 370/85.1, 85.5, 85.15, 370/85.7, 95.1

[56] References Cited

U.S. PATENT DOCUMENTS

| | | |
|---|---|---|
| 3,732,374 | 5/1973 | Rocher . |
| 3,870,825 | 3/1975 | Roberts . |
| 3,937,892 | 2/1976 | Bloch . |
| 4,156,112 | 5/1979 | Moreland . |
| 4,503,533 | 3/1985 | Tobagi . |
| 4,763,320 | 8/1980 | Rudolph . |

FOREIGN PATENT DOCUMENTS

| | | |
|---|---|---|
| 3211966 | 3/1982 | Fed. Rep. of Germany . |
| 3319106 | 5/1983 | Fed. Rep. of Germany . |

*Primary Examiner*—Douglas W. Olms
*Assistant Examiner*—Christopher O. Edwards
*Attorney, Agent, or Firm*—Dykema Gossett

[57] ABSTRACT

A method of integrating one or more accessory function modules in telecommunication systems is disclosed, especially digital telephone extension systems, where communication between two user terminals is achieved using time division multiplexing by assigning a pair of time slots through a central exchange, and by preassigning at least one particular time slot which can be accessed to allow communication between the accesory function module or modules and the user terminals.

11 Claims, 3 Drawing Sheets

4,995,034

METHOD OF INTEGRATING ONE OR MORE ACCESSORY FUNCTION MODULES IN TELECOMMUNICATIONS SYSTEMS AND ACCESS CIRCUIT FOR USE THEREWITH

This is a continuation of co-pending application Ser. No. 07/001,800 filed on Jan. 9, 1987, now abandoned.

TECHNICAL FIELD

The invention relates to a method of integrating one or more accessory function modules in telecommunications systems, in particular digital telephone extension systems, in which communication between two user terminals is accomplished by using time division multiplexing and assigning a pair of time slots through a central exchange.

BACKGROUND ART

With the introduction of digital user terminals, such as digital telephones in digital telephone extension systems, accessory functions can be made available to users that could not be provided heretofore by analog type conventional telephones. Among such accessory functions are services such as an alphabetically and numerically arranged directory, caller identification and name entry, transmission of brief messages from one user to another, or alarm functions for schedule monitoring.

These accessory functions are note directly related to the communications exchange, and are therefore not normally supplied by the exchange itself. Instead accessory functions are most conveniently implemented by employing one or more accessory function modules which are capable of communicating with the user terminals.

Communication between the accessory function module or modules and the user terminals may be carried out in a number of ways. Such communication might be accomplished, for example, byway of separate lines from the accessory function module or modules to each user terminal. This approach would be costly, of course because of the extensive circuitry that would be required by the numerous separate lines. Another disadvantage of the use of separate lines would be that the cost of refitting existing digital telecommunications systems with accessory function modules would be prohibitively high.

Alternatively, communication of the accessory function module or modules with the user terminals might be accomplished in the same way as communication between two user terminals, namely by assignment of a pair of time slots through the central exchange. While this approach is attractive in that existing telecommunication systems could be reequipped, an additional burden is nevertheless placed on the exchange system which is unrelated to the function of the exchange system itself.

The object of the present invention, therefore, is to provide a method of communication between one or more accessory function modules and the user terminals that requires the use of only a modest amount of additional circuitry and that does not place an additional burden the exchange system.

SUMMARY OF THE INVENTION

The foregoing object is accomplished according to the present invention by accessing at least one preassigned time slot which is dedicated to communications between the accessory function module or modules and the user terminals.

The use of at least one specifically reserved time slot for communication of the accessory function module or modules with the user terminals has the advantage that within the digital telecommunications system, one or more message or data channels are created that do not engage the central exchange, and which only insignificantly affect the transmission capacity of the digital telecommunication system. Furthermore, since the method according to the invention requires no separate lines between the accessory function module and modules and the user terminals, even a plurality of accessory function modules can be simply and economically integrated into existing telecommunication systems, such as digital telephone extension systems for example.

Since the ordinary rate of 64 kilobits of data per second afforded by the reservation of one time slot is more than sufficient for communication between an accessory function module and the user terminals, this channel capacity may be further subdivided. This is done, according to one implementation of the invention in that only a particular portion of the total channel capacity of the time slots, or of one of the time slots, reserved in each instance is selected for communication of several accessory function modules with the user terminals.

Advantageously, using a data bus consisting of n, in particular eight, parallel lines for each direction of transmission, in each instance one of the n bits provided in parallel of a data word occurring during a time slot is selected.

In a further implementation of the method according to the invention, the reserved time slot or slots are assigned to the accessory function module or modules and the user terminals during the initializing phase of the telecommunications system by transmission of the time slot number in question. In this manner, the accessory function modules and the user terminals are preset only once, so that no control operation is required during actual transmission.

Like the time slot number, the several portions of the total channel capacity or of one of the reserved time slots may then be assigned to the accessory function modules and user terminals during the initializing phase of the telecommunications system. In that case, the assignment of a particular bit of an n-bit data word occurring during a time slot may advantageously be assigned by transmitting the bit number in question.

Alternatively, the time slot number provided in each instance for the accessory function modules and user terminals, and optionally bit numbers as well, may be preset in the respective modules and units, or may be settable manually by means of coding switches.

In a further implementation of the invention, the accessory function module or modules and the user terminals access the reserved time slots or one of the reserved time slots by decoding the same. This mode of time slot accessing is distinguished in that intervention of the central exchange is not required.

The decoding of the one or more reserved time slots is controlled by the transmitted or preset time slot number. This is advantageous in that, for decoding, coincidence of the current time slot number with the transmitted or preset time slot number is ascertained. For this purpose, the current time slot number at a given time may be determined by counting the receiving and/or sending pulses of the current pulse frame, wherein each pulse frame comprises the time interval from occurrence of a time slot, having for example the number 0, until occurrence of number 0 of the next following time slot.

The method explained above thus term is creation of one or more mutually independent data paths between the accessory function module or modules and the user terminals. In the case where the central exchange is structure according to the so-called "WIRED-OR" principle, access to the data paths may be controlled by techniques of so-called "multi-point" connections such as for example CSMA or polling techniques. Such methods permit especially effective utilization of the several data paths by several users at a time.

The exchange of information between the user circuit connected to public telephone networks and the user terminals connected to the same networks may, for example, be accomplished on so-called D-channels according to ISDN convention.

An access circuit for sending and receiving operations is configured to practice the method of the present invention, such that to decode the one or more reserved time slots, a programmable counter is provided which contains a comparator whose inputs are connected to the outputs of a storage register for the transmitted time slot number and a counter incremented by the send and receive pulses of the current pulse frame, and a first gate is provided with the send pulse and the comparator output signal at its inputs and the transmitter release signal at its output. In this manner, the transmitter release signal is always produced just when: (1) the transmitted or preset time slot number coincides with the then current time slot number and, (2) a send pulse occurs. The rest input of the counter is preferably activated by the send and receive synchronizing signal of the telecommunications system.

In a further refinement of the access circuit, for the selection and/or assignment of a particular bit of an n-bit data word occurring during a time slot, a 1-out-of-n selector controllable by the transmitted bit number is provided. With the 1-out-of-n selector, the total channel capacity of a time slot can be simply subdivided into n subchannels. A second gate is provided, having its inputs connected to receive the comparator output signal and the transmission data, and its output connected to the 1-out-of-n selector. As a result of this second gate, the data to be transmitted is switched to the transmission line selected for transmit operation by the transmitted bit number whenever the transmitted time slot number coincides with the current times to number.

In another embodiment of the access circuit, namely for receive operation, a third gate is provided, with the receive pulse and the comparator output signal provided to its inputs and the receiver release signal at its output. Such receiver release signal is produced when: (1) the transmitted or preset time slot number coincides with the current time slot number and (2) a receive pulse is produced.

In a further refinement of the access circuit for the receive mode, a fourth gate is provided, whose inputs are connected to the outputs of the comparator and the 1-out-of-n selector, and at whose output the reception data appears. As a result of this fourth gate, the bit place preassigned by the transmitted or preset bit number in a data word transmitted within a time slot is read out when the current time slot number coincides with the corresponding transmitted or preset time slot number.

BRIEF DESCRIPTION OF THE DRAWINGS

In the following description, the invention will be illustrated with reference to an embodiment by way of example. In the drawings.

DETAILED DESCRIPTION OF THE PREFERRED EMBODIMENTS

Figure 1:
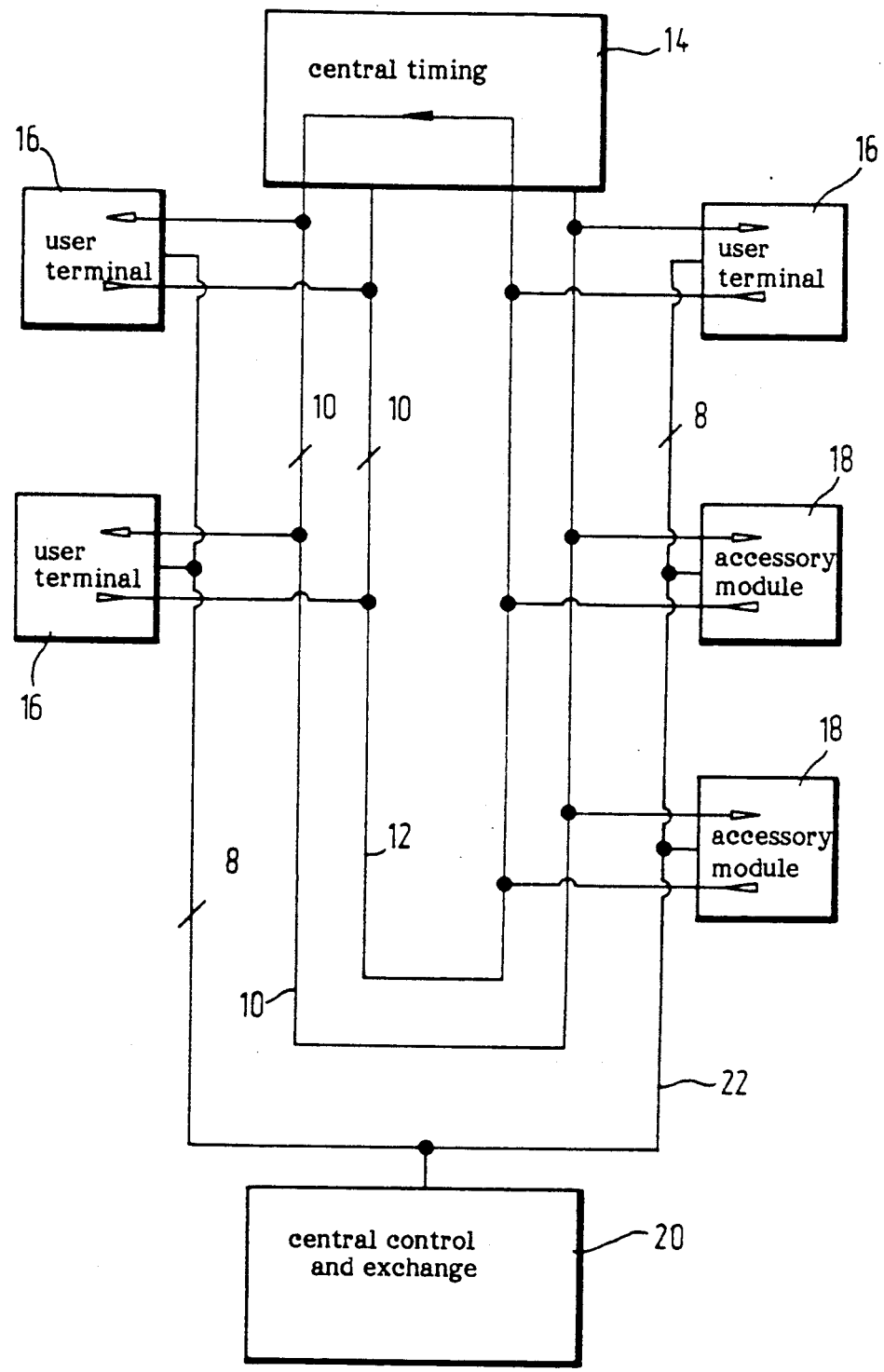
FIG. 1 is a block diagram of a digital telecommunication system.

In the following, first with reference to the block diagram of FIG. 1, the structure and the generally function of a digital telecommunications system operating on time division multiplexing principles will be described. In such a digital telecommunication system, the transmission line comprises a ten-bit wide transmission bus 10 and a ten-bit wide reception bus 12 independent of bus 10. In the case of both the transmission bus 10 and the reception bus 12, eight bits serve for data transmission and one each for transmission of synchronizing and timing pulses. The synchronization and timing pulses for both the transmission bus 10 and the reception bus 12 are generated by a central timer 14.

Connected to the transmission bus 10 and reception bus 12, are digital modules in the form of user terminals 16 and digital accessory function modules 18. These digital modules 16, 18 are controlled by a central control and exchange unit 20 by way of a parallel and series control bus 22. The central control and exchange unit 20 controls: (1) the communication between two user terminals 16 by assignment of a pair of time slots and, (2) the access circuits (see FIG. 3) contained in the digital modules 16 and 18, which enable communication between user terminals 16 and accessory function modules 18 without engaging the central control and exchange unit 20.

Figure 2:
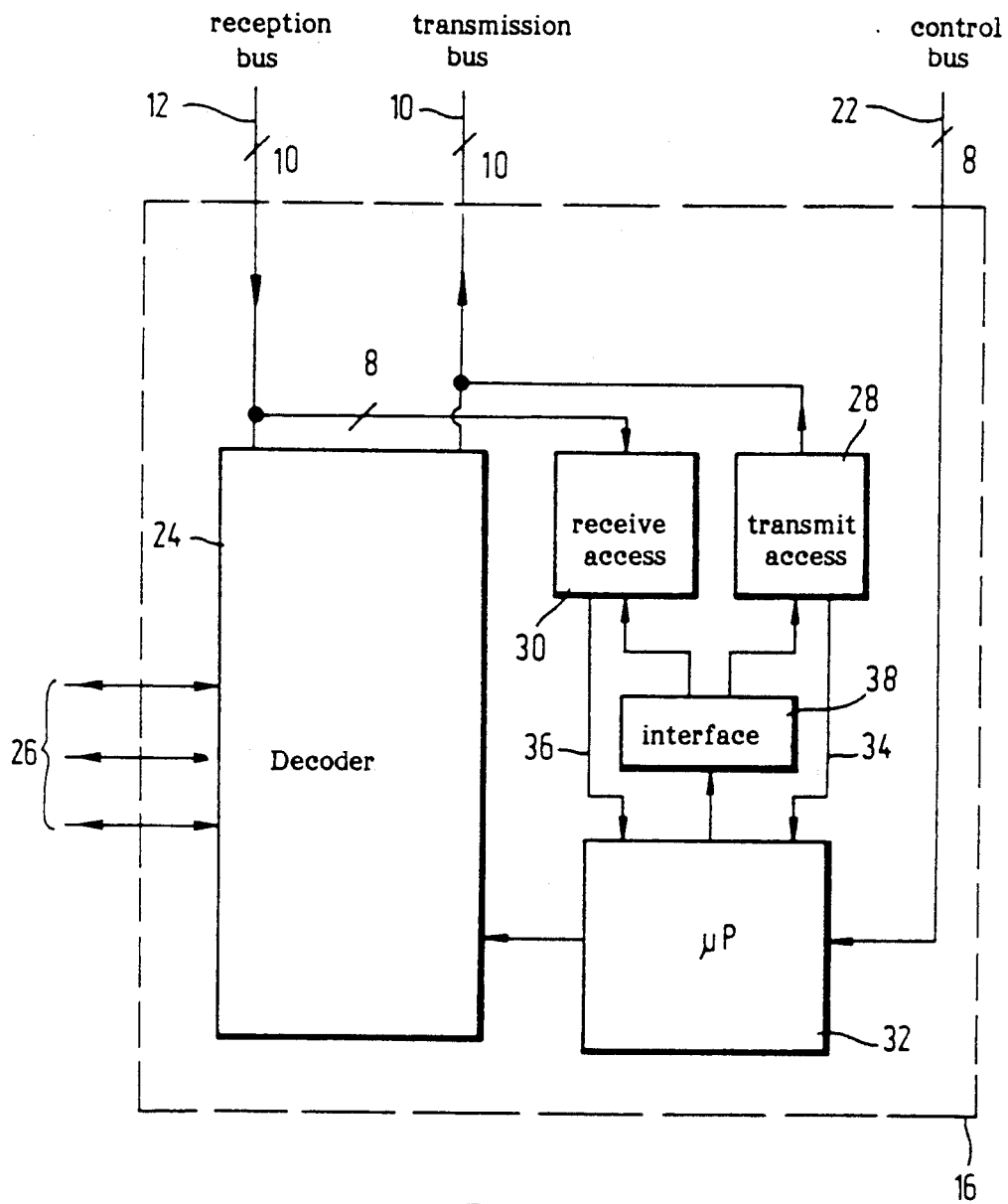
FIG. 2 is a block diagram of a digital module.

The general structure of a digital module 16, 18 will now be described with reference to the block diagram of FIG. 2, which shows a digital user terminal. The transmission bus 10 and the reception bus 12 are connected to a decoder 24 for transmission and reception time slots for user lines 26. The transmission bus 10 is further connected to an access circuit 28 for transmit operation. Similarly, the reception bus 12 is connected to an access circuit 30 for receive operation. The two access circuits 28 and 30 serve to decode the reserved time slots provided for communication of the accessory function module or modules 18 (FIG. 1) with the user terminals 16 (FIG. 1). Both the decoder 24 for transmission and reception time slots for user lines 26 and the two access circuits 28 and 30 are controlled by a microprocessor system 32, connected in turn to the control bus 22. Data exchange between the two access circuits 28, 30 and the microprocessor system 32 takes place by way of connecting lines 34 and 36 through interface 38. The user terminal just described differs in structure from a digital accessory function module essentially in that in the digital accessory function module, there is not decoder 24 form transmission and reception time slots for user lines 26.

Figure 3:
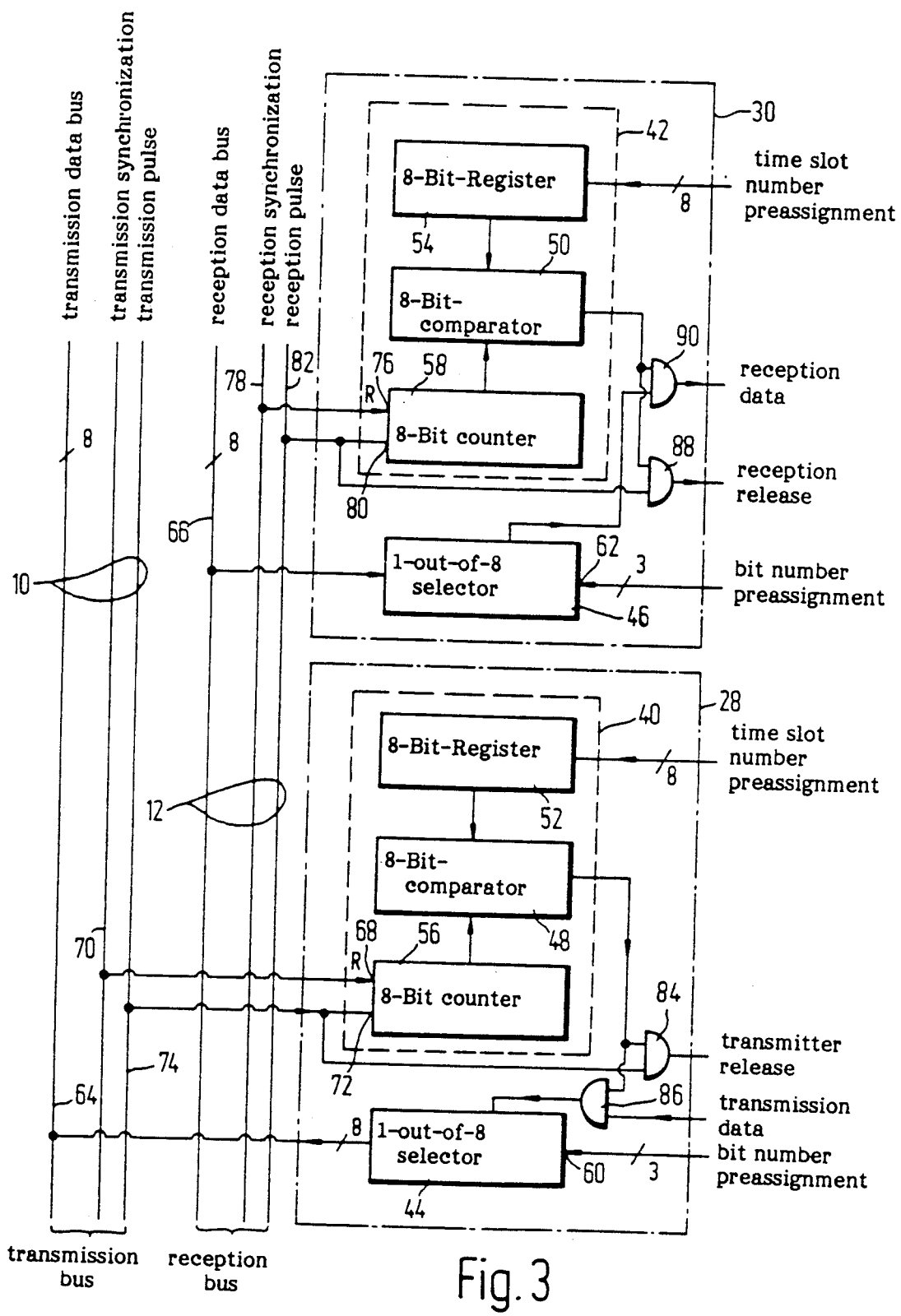
FIG. 3 is a block diagram of an access circuit for transmit operation and an access circuit for receive operation.

Reference is now made to FIG. 3, wherein the circuitry and function of the access circuits for transmission and reception operation are depicted, indicated in FIG. 3 as blocks 28 and 30.

The top half of FIG. 3 shows, within the dash-dot-dash line, the access circuit 30 for reception operation. Likewise shown within a dash-dot-dash line in the bottom half of FIG. 3 is the access circuit 28 for transmission operation.

Since the access circuit 28 for transmission operation is almost identical in structure with the access circuit 30 for reception operation, the two will be explained together. Each access circuit 28, 30 contains a programmable counter 40, 42 (indicated by dashed lines) and a 1-out-of-8 selector 44, 46. The programmable counters 40, 42 each contain an 8-bit comparator 48, 50 whose inputs are connected to the outputs of an 8-bit comparator 48, 50 whose inputs are connected to the outputs of an 8-bit storage register 52, 54 and an 8-bit counter 56, 58. The inputs of the 8-bit storage register 52, 54 are connected by way of the microprocessor system 32 (FIG. 2) to the control bus 22 (FIG. 2), by way of which they receive the time slot number of the one or more reserved time slots. Further, the control inputs 60, 62 of the 1-out-of-8 selectors 44, 46 are connected by way of the microprocessor system 32 (FIG. 2) to the control bus 22 (FIG. 2). By way of the latter, the 1-out-of-8 selectors 44, 46 may be set to the preassigned bit number. The output of the 1-out-of-8 selector is connected by way of an 8-bitline to the transmission data bus 64, which is 8 bits in width. Similarly the 1-out-of-8 selector 46 is connected at its 8-bit input to the reception data bus 66, which is likewise 8 bits in width. Thus, while the 8-bit counter 56 of the access circuit 28 for transmission operation is connected by its reset input 68 to the transmission synchronizing line 70 and by its counter input 72 to the transmission pulse line 74, the 8-bit counter 58 of the access circuit 30 for transmission operation is connected by its reset input 76 to the reception synchronizing line 78 and by its counter input 80 to the reception pulse line 82.

To form the transmitter release signal, a first AND gate 84 is connected by its two inputs to the transmission pulse line 74 and to the output of the comparator 48. A second AND gate 86 connected by its output to the 1-out-of-8 selector 44 is further connected by one input to the output of the 8-bit comparator 48. Its second input is activated by the transmission data.

Similar to the transmission release signal, the receiver release signal is formed by AND gating there reception pulse with the equality signal of the 8-bit comparator 50. For this purpose, a third AND gate 88 is provided which has one input thereof connected to the output of the 8-bit comparator 50 and the other input thereof connected to the reception pulse line 82. To form the reception data, a fourth AND gate 90 is connected by one of its inputs to the output of the comparator 50 and by its other input to the output of the 1-out-of-8 selector 46.

The structure of the access circuits 28, 30 for transmission and reception operation having been described above, their function will now be explained. During initialization of the digital telecommunication system, all digital modules namely the user terminals 16 (FIG. 1) and the accessory function modules 18 (FIG. 1) are notified by the central control and exchange unit 20 (FIG. 1) by way of control bus 22 of the time slots number or numbers of the time slot or slots reserved for accessory function and of the bit or bits reserved within the time slot or slots. This information is generated by the microprocessor system 32 (FIG. 2). The generated information is referred to in FIG. 3 as "time slot number preassignment" and "bit number preassignment."

In the access circuit 28 for transmission operation, the transmitted time slot number is copied into he 8-bit register 52 and stored. The 8-bit counter 56 counts the transmission pulses supplied by way of transmission bus 10. In the 8-bit comparator 48, the contents of the 8-bit storage register 52 are compared with the position of the counter 56. If they coincide, the comparator 48 delivers a signal at its output that is gated with the transmission pulse through the AND gate 84 to form the transmitter release signal. The transmitter release signal having been generated, the data to be transmitted is gated through the AND gate 86 along with the equality signal at the output of the comparator 48 and is then supplied to the 1-out-of-8 selector 44. The selector 44 switches the data to be transmitted to that portion of the transmission data bus 64 which has been selected through the "bit number preassignment."

In the access circuit 30 for reception operation, the receiver release signal is formed much like the transmitter release signal in the access circuit 28 for transmission operation, gating the output signal of the 8-bit comparator 50 with the reception pulse in the AND gate 88.

The reception data is first supplied to the 1-out-of-8 selector 46 by the reception data bus 66, which is eight bits in width. Out of the 8-bit data words, a bit is selected by way of the 3-bit "bit number preassignment." The desired bit place of the desired time slot is accessed by gating the output signal of the 1-out-of-8 selector 44 with the output signal of the comparator 50 in the AND gate 90.

What is claimed is:

1. For use in a telecommunication system of the type including plurality of user terminals (16) and a central exchange which provides time division multiplexed communications between the terminals (16) and at least one accessory function module (18), a method of providing communication between said accessory function module (18) and said terminals (16), comprising the steps of:
    (A) assigning at least on fixed time slot for communications between said accessory module (18) and said terminals (16);
    (B) accessing said communications in said one fixed time slot assigned in step (A);
    (C) dividing said one fixed time slot into a plurality of communication channels; and
    (D) selecting only a portion of said channels for each communication between one of said modules (18) and one of said terminals (16).

2. The method according to claim 1 wherein:
    step (C) is performed by forming an n parallel bit data word on a data bus (764, 66) during said one fixed time slot, and
    step (D) is performed by selecting one of the n parallel bits during said one fixed time slot.

3. The method according to claim 1, including the steps of:
    initializing said system and
    assigning time slots to said modules (18) and said user terminals (16) to allow communication between said modules (18) and said terminals (16) by assigning a number to each of said latter mentioned time slots and transmitting said time slot numbers to said modules (18) and user terminals (16).

4. The method according to claim 3, including the steps of:

assigning particular portions of the assigned time slots to said modules (18) and said user terminals (16), and transmitting during said initializing step to said modules (18) and user terminals bit numbers of a multibit data word, wherein each bit of the data word corresponds to a communication channel.

5. The method of claim 1, wherein step (A) is performed by assigning numbers to the fixed time slots, the fixed time slot numbers are transmitted to each of the modules (18) and user terminals (16), and step (B) is performed by ascertaining the coincidence of a fixed time slot number transmitted to a module (18) or user terminal (16) and a reference number.

6. The method according to claim 5, wherein the reference number is produced by:

forming consecutive pulse frames during which reception and transmission pulses occur, and counting the transmission and reception pulses which occur in each frame.

7. For use in a telecommunications system of the type including a plurality of user terminals (16), one or more accessory function modules (18) communicatively connected with said user terminals (16) and a central exchange which provides time division multiplexed communication between said user terminals (16) and between said one or more modules (18) and said user terminals (16) by assigning communication time slots each having a time slot number, including at least one reserved time slot of fixed duration for communications between the one or more modules (18) and the user terminals (16), and means for sending to each of said modules (18) and user terminals (16) transmission pulses and reception pulses during each of a train of pulse frames respectively corresponding in duration to said time slots, and for sending to each of said modules (18) and said user terminals (16) transmission synchronization signals and reception synchronization signals, a circuit for accessing communications occurring during said one reserved time slot of fixed duration, comprising:

means for dividing said reserved time slot of fixed duration into a plurality of pulse train frames;

programmable counter means (40, 42) including (1) register means (52, 54) for receiving and storing a number assigned to said one reserved time slot, (2) counter means (56, 58) for receiving and counting one of either said transmission pulses or said reception pulses occurring during each pulse frame, and (3) comparator means (48, 50) for comparing the time slot number stored in said register means (52, 54) with the pulse count of said counter means (56, 58), and having an output for producing an output signal when the time slot number is in a prescribed relationship to the pulse count; and first gate means (84, 90) having a first input for receiving one of either the reception pulses or the transmission pulses and a second input for receiving and output signals from said comparator (48, 50), said first gate mans (84, 90) further having an output for producing one of either a transmitter release signal or a reception release signal.

8. The circuit according to claim 7, wherein said counter means (56, 58) includes a reset input (68, 76) for receiving one of either said transmission synchronization signals or said reception synchronization signals.

9. The circuit according to claim 7, wherein data is transmitted between said modules (18) and said user terminals (16) in the form of multibit data words over n parallel transmission lines (64) and said circuit further includes:

second gate means (86) having a first input for receiving data to be transmitted, a second input for receiving said output signal from said comparator means (48), and an output, and one-of-n selector means (44) having a first input connected to the output of said second gate means (86) for receiving data to be transmitted, a second input for selecting one of said transmission lines (64) over which data is to be transmitted, and an output connected to said transmission lines (64).

10. The circuit according to claim 7, wherein data is transmitted and received between said modules (18) and said user terminals (16) in the form of respective multibit data words over corresponding n parallel transmission lines and n parallel reception lines, and said circuit further includes:

second gate means (86) having a first input for receiving data to be transmitted, a second input for receiving said output signal from said comparator means (48), and an output, first one-of-n selector means (44) having a first input connected to the output of said second gate means (86) for receiving data to be transmitted, a second input for selecting one of said transmission lines (64), and an output connected to said transmission lines (64), and third gate means (88) having a first input for receiving said reception pulses, a second input for receiving said output signal from said comparator means (50) and an output for producing said reception release signal.

11. The circuit according to claim 10, including:

second one-of-n selector means (46) having a first input connected to said n parallel reception lines to receive data over a selected one of said reception lines, a second input for selecting one of said n reception lines and an output for delivering received data over the selected reception line, and fourth gate means (90) having a first input for receiving said output signal from said comparator means (50), a second input for receiving data from the output of said second one-of-n selector means (46), and an output for delivering data received from the selected reception line.

* * * * *

UNITED STATES PATENT AND TRADEMARK OFFICE
CERTIFICATE OF CORRECTION

PATENT NO. : 4,995,034
DATED : February 19, 1991
INVENTOR(S) : Hartmut Lubcke; Martin Backhaus; and Harald Schreiber It is certified that error appears in the above-identified patent and that said Letters Patent is hereby corrected as shown below:

Column 6, line 42, change "on" to --one--.

Signed and Sealed this

First Day of December, 1992

Attest:

DOUGLAS B. COMER

*Attesting Officer*  *Acting Commissioner of Patents and Trademarks*